United States Patent [19]
Dannenberg et al.

[11] Patent Number: 6,053,043
[45] Date of Patent: Apr. 25, 2000

[54] TURN LOCK BEZEL FOR GAUGE EXTRACTION AND RETENTION

[75] Inventors: Robert D. Dannenberg, Fort Wayne, Ind.; Leonard P. Lachmann; Thomas V. Lozito, both of El Paso, Tex.

[73] Assignee: Navistar International Transportation Corp, Chicago, Ill.

[21] Appl. No.: 08/404,704

[22] Filed: Mar. 15, 1995

Related U.S. Application Data

[63] Continuation-in-part of application No. 08/037,941, Mar. 26, 1993, abandoned.

[51] Int. Cl.$^7$ .................................................. G04B 37/00
[52] U.S. Cl. ................................................................ 73/431
[58] Field of Search ............................................. 73/431

[56] References Cited

U.S. PATENT DOCUMENTS

| | | | |
|---|---|---|---|
| 2,346,495 | 4/1944 | Lingel | 73/431 |
| 2,402,360 | 6/1946 | Bevin | 73/431 |
| 2,426,800 | 9/1947 | Triplett | 73/431 |
| 3,152,480 | 10/1964 | Hoff | 73/431 |
| 3,166,941 | 1/1965 | Waito et al. | 73/431 |
| 3,322,380 | 5/1967 | Ajjel et al. | 73/431 |
| 3,807,236 | 4/1974 | Leone | 73/431 |
| 3,952,598 | 4/1976 | Ferguson et al. | 73/431 |
| 4,052,899 | 10/1977 | Longhetto | 73/431 |
| 4,501,152 | 2/1985 | Wetterhorn et al. | 73/431 |
| 4,595,301 | 6/1986 | Taylor | 73/431 |
| 4,628,731 | 12/1986 | Copeland | 73/431 |
| 4,638,666 | 1/1987 | Wong et al. | 73/431 |
| 4,753,112 | 6/1988 | Wetterhorn et al. | 73/431 |
| 4,807,472 | 2/1989 | Brown et al. | 73/431 |
| 4,920,799 | 5/1990 | Low | 73/431 |
| 5,146,782 | 9/1992 | Rasmussen | 73/431 |
| 5,181,422 | 1/1993 | Leonard et al. | 73/431 |

*Primary Examiner*—George Dombroske
*Attorney, Agent, or Firm*—Jeffrey P. Calfa; Dennis Kelly Sullivan

[57] ABSTRACT

A turn lock bezel mounts an instrument gauge on an instrument panel by exerting axial retention forces that force a bezel ring against a front margin of a mounting aperture in the instrument panel and a dial graphic and dial plate of the gauge against a rear edge of a retaining ring that holds a window glass in the bezel ring and passes axially into the mounting aperture. In a first embodiment, when the bezel is turned a small acute angle in one direction, it can be extracted from the mounting aperture leaving the gauge behind in the instrument panel, and when turned a small acute angle further, the bezel can still be extracted, but it now extracts the gauge too. In a second embodiment, a lost motion connection is provided between the bezel and the gauge so that finger tip clearance will exist between the rear edge of the bezel ring and the instrument panel before the bezel begins to extract the gauge. This allows the person to get a better grip for better overcoming resistance that may be encountered in separating the electrical terminals of the gauge from mating terminals in a circuit board in the instrument panel.

31 Claims, 4 Drawing Sheets

TURN LOCK BEZEL FOR GAUGE EXTRACTION AND RETENTION

CROSS-REFERENCE TO A RELATED APPLICATION

This application is a continuation-in-part of application Ser. No. 08/037,941, filed Mar. 26, 1993 now abandoned.

FIELD OF THE INVENTION

This invention relates generally to instrumentation gauges and in particular to the mounting of instrumentation gauges on instrument panels, such as in an automotive vehicle.

BACKGROUND AND SUMMARY OF THE INVENTION

Instrument gauges, such as those used in truck instrument panels for decades, have typically been individual component assemblies (case gauges) that are attached to an instrument panel plate by way of U-shaped clamps and retaining fasteners. Electrical connection to a particular gauge is accomplished with individual wires from battery voltage, from ground, and from a remote sensor that is matched to the characteristics of that particular gauge. These wires are secured to the gauge with fasteners and lock washers. This type of design is still used quite often in many of today's new trucks.

Replacement of a failed gauge requires extensive disassembly of the instrument panel plate using certain tools to release the fasteners and clamps that hold the gauge to the plate. Other tools are required to release the fasteners holding the wires to the gauge. Reinstalling a new gauge requires that the proper wire be placed on the correct terminal, or use of the gauge could be rendered inoperable or in some cases damaged beyond repair.

In recent years, instrument panel gauges have begun being packaged in containers or cluster packs that hold more than one gauge. Similar problems, though less in magnitude, still exist for cluster assemblies when a gauge needs to be replaced. Front covers require tools to open up the pack so that a defective gauge may be replaced. In some cases, additional fasteners are used to retain the gauge to the cluster housing.

The present invention relates to a new and unique means for mounting a gauge on an instrument panel by means of a bezel so that it becomes possible for a gauge to be serviced more expediently and without the extensive use of assembly and disassembly tools and procedures that characterizes earlier servicing of instrument panel gauges.

The use of what may be called a turn lock bezel for mounting an instrumentation gauge in an instrument panel is not broadly new. It is known to use a turn lock bezel to trap a plastic lens on an individual case gauge housing. The gauge with which the known turn lock bezel is used is nevertheless still mounted with clamps and fasteners to an instrument panel plate. The gauge movement and wire connections are mated to the housing case with more individual fasteners.

The turn lock bezel of the present invention is well-suited for use with plug-in type instrumentation gauges, and for servicing allows such a plug-in type gauge to be extracted from the instrument panel along with the bezel when the bezel is turned to one of several particular circumferential positions and pulled away from the instrument panel. In a first embodiment of the present invention, there are a total of three particular circumferential positions to which the turn lock bezel can be turned, including the one position just mentioned. In another of these three circumferential positions, the turn lock bezel can be removed from the instrument panel by itself, but without also extracting the gauge. Removal of the bezel by itself without the gauge may be desirable for different reasons, such as making it easier for the window of the bezel to be cleaned. When the turn lock bezel is operated to still another of these three circumferential positions, it securely locks the gauge and itself on the instrument panel.

Because the turn lock bezel can be operated to any of the various circumferential positions simply by turning without the use of additional tools, faster and less costly servicing procedures become possible. There is also less possibility for accidental damage to instrument panel components than in the case of the prior gauge mountings described above because there is significantly less use of assembly and disassembly tools. When the bezel is in the position locking itself and the gauge on the instrument panel, it also both covers the exposed edge of the mounting aperture in the instrument panel and prevents the intrusion of dirt and ambient light between the instrument panel and bezel.

Other advantages of using turn lock bezels of the present invention arise in multiple-gauge clusters. In such a cluster, a decorative cover plate can be secured to a gauge housing that mounts in the instrument panel as a unit so as to guard against accidental disassembly of such unit prior to its mounting in the instrument panel. Also, because each gauge in a cluster mounts in its own mounting aperture independently of the others in their own mounting apertures, an adverse accumulation of tolerances is apt to be less critical.

A second embodiment of the present invention is in certain respects an improvement on the first embodiment. For any of various reasons, such as space constraints or aesthetic considerations, certain bezels are relatively shallow, meaning that their axial dimension, or thickness, is sufficiently thin that they are difficult to manually grasp for turning. Moreover, they may have a low friction surface. For example, a shallow bezel having a smooth chromed surface may cause a person's fingers to tend to slip off the bezel as he or she attempts to turn it. An improved grip for turning the bezel may be achieved by incorporating shallow molded-in axial grooves in the radially outer surface of the bezel ring, i.e. grooves that are perpendicular to the housing faceplate.

A further consideration in facilitating extraction of a gauge using a turn lock bezel according to the present invention involves the friction force with which the electrical terminals that project rearwardly from the back of the gauge engage mating terminals on a printed circuit board that provides the electrical connections to the gauge. If relatively significant forces exist, they will require that the person extracting the gauge by means of the turn lock bezel apply a sufficiently large extraction force in order to overcome these forces.

A further improvement that is provided by the second embodiment of turn lock bezel of the present invention relates to assuring a certain amount of axial lost motion between the bezel and the gauge during the extraction process that was not present in the first embodiment and that results in the rear edge of the bezel ring becoming sufficiently spaced from the face of the instrument panel housing that the person's finger tips can grip this rear edge before the friction force of disengaging the gauge terminals from those on the printed circuit board are encountered. Providing this axial lost motion that allows the bezel ring to be so positioned before the gauge itself begins to be extracted significantly facilitates the gauge extraction to an extent that is calculated to assure that the entire gauge extraction operation is performed solely by hand. By contrast in an embodiment where there is at most a very small amount of such axial lost motion, or even none at all, a person may be prevented from getting a satisfactory grip on the bezel ring at the time when significant gauge extraction resistance is encountered, and as a consequence, the person may be tempted to use a tool to pry the bezel away from the instrument panel housing. The use of a procedure that involves a prying tool is to be discouraged because of the possibility of causing accidental damage. The second embodiment of the invention is intended to avoid any temptation for the person to use a prying tool in the manner just hypothecated.

The foregoing features, advantages, and benefits of the invention, along with additional ones, will be seen in the ensuing description and claims which are accompanied by drawings. Such drawings present two embodiments of the invention, in presently preferred forms, and in accordance with the best mode contemplated at this time for carrying out the invention.

DESCRIPTION OF THE FIRST EMBODIMENT

Figure 1:
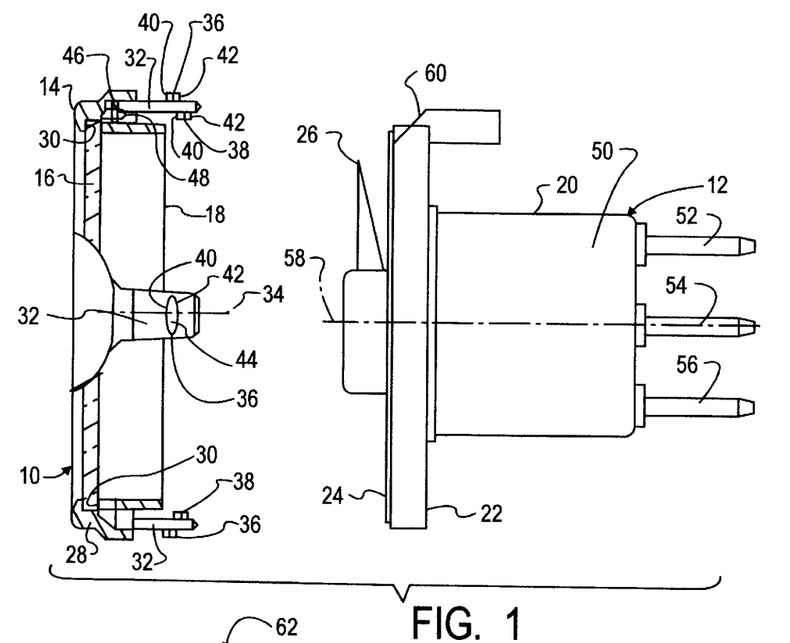
FIG. 1 is an exploded side view of a bezel/glass/retaining ring assembly and a gauge assembly according to a first embodiment of the present invention, the former assembly being shown in partial cross section.

FIG. 1 shows a bezel/glass/retaining ring assembly 10 and a gauge assembly 12. Assembly 10 comprises a bezel 14, a glass 16, and a retaining ring 18 in assembled relationship. Assembly 12 comprises a gauge movement 20, a dial plate 22, a dial graphic 24, and a pointer 26 in assembled relationship.

Bezel 14 comprises a circular ring 28 having a radially inwardly, axially rearwardly facing circular groove 30 immediately contiguous its inside diameter (I.D.). Radially outwardly of groove 30, bezel 14 comprises several fingers 32 that extend axially rearwardly from ring 28. In the illustrated embodiment, there are three such fingers 32 that are arranged in a circumferentially non-symmetric manner (i.e. circumferentially keyed) about a central axis 34 of bezel 14 with which ring 28 is concentric. Fingers 32 are each equally radially distant from axis 34. Proximate the distal end of each finger 32 are two radial projections 36, 38. Projections 36 project radially outwardly from their respective fingers 32 while projections 38 project radially inwardly. Moreover, projections 36 are axially closer to the proximal ends of their respective fingers 32 than are projections 38 so that projections 38 are therefore rearward of projections 36. Each projection 36 is at the same axial distance from a plane that passes through the rear edge of ring 28 perpendicular to axis 34, and each projection 38 is also at the same axial distance from that plane, although the latter axial distance is somewhat greater than the former. Each projection 36, 38 is identical comprising a front axially facing convex surface 40, a rear axially facing convex surface 42, and a radially facing end surface 44.

Glass 16 is a circular transparent window that seats in groove 30 and is held in place there by retaining ring 18. Retaining ring 18 is circular and comprises a front edge that bears against the rear face of the radially outer margin of glass 16 at approximately the same radial distance from axis 34 as that of groove 30 from axis 34. Around its periphery retaining ring 18 further comprises several radially outwardly projecting tabs 46 that provide for attachment of retaining ring 18 to bezel ring 28 by any conventional means of attachment 48. In this way, glass 16 is held securely seated in groove 30.

Gauge movement 20 comprises a housing 50 enclosing a conventional electromechanical movement. The illustrated gauge movement 20 comprises three terminals 52, 54, 56 projecting axially rearwardly from the rear of housing 50. Terminals 52, 54, 56 make electrical connection with mating terminals (not shown in FIG. 1) when gauge movement 20 is installed in an instrument panel as will be explained in more detail later on. The particular signal from the corresponding remote sensor (not shown) that is delivered to gauge movement 20 is effective to position pointer 26 to a corresponding circumferential position about an axis that is coincident with a central axis 58 of gauge assembly 12. In this way, the gauge presents a display of the value of the sensor input to it. The pointer position is read against a scale that is contained on the front face of dial graphic 24 which is disposed on the front face of dial plate 22. Dial plate 22 is itself disposed over the front of housing 50 in assembly therewith. Artificial illumination for reading the gauge at night is provided in known manner by piping light from a light source (not shown) through an internal reflecting surface 60.

Figure 2:
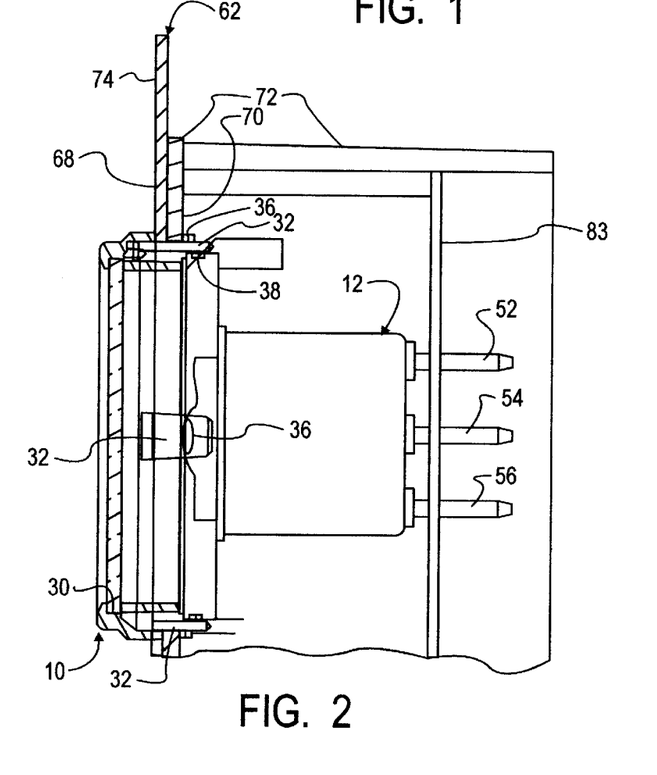
FIG. 2 is a view in the same direction as that of FIG. 1, on a slightly smaller scale, showing the two assemblies in assembly on an instrument panel.
Figure 3:
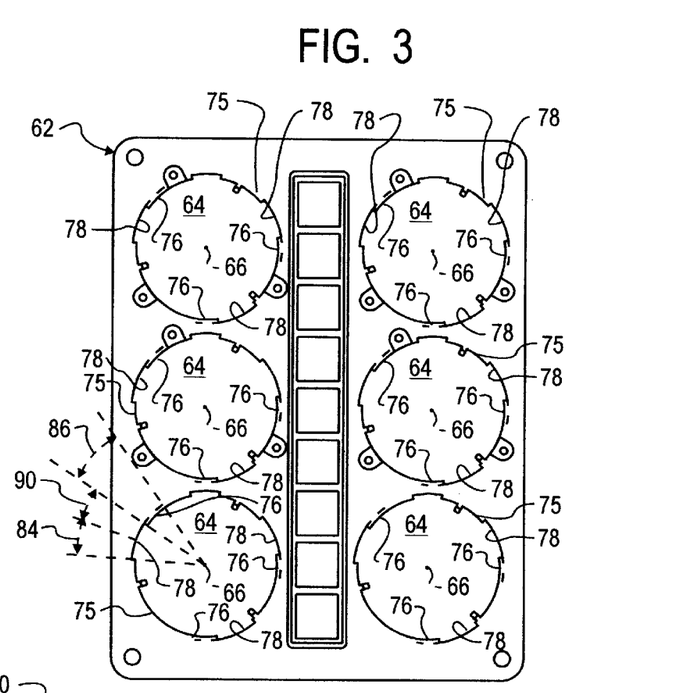
FIG. 3 is a front plan view of a representative instrument panel with which the invention is used.
Figure 4:
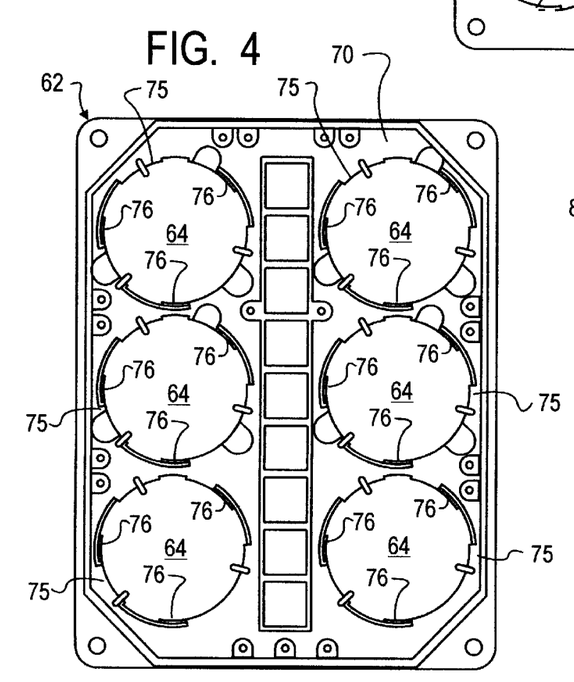
FIG. 4 is a rear view of FIG. 3.

Assemblies 10 and 12 are adapted to be mounted on an instrument panel, such as the one 62 shown in FIGS. 3 and 4. That panel 62 has six gauge mounting apertures 64, each of which is capable of mounting an assembly 10 and an assembly 12 in cooperative association. Referring now to FIGS. 3 and 4, one can see that each aperture 64 comprises a central axis 66 that extends through instrument panel 62 between front and rear faces 68 and 70. Each aperture 64 is generally circular, but comprises features adapted for accommodating the mounting of assemblies 10 and 12. Instrument panel 62 comprises a housing 72 (FIG. 2) having a front wall covered by a cover plate 74. Each aperture 64 extends both through the front housing wall and through cover plate 74.

Each aperture 64 is circumferentially bounded by a corresponding marginal edge portion 75 of instrument panel 62 that is disposed radially of axis 66. Each such marginal edge portion comprises three ramps 76 that are circumferentially arranged in the same general non-symmetrical pattern as are fingers 32. Each ramp 76 extends a limited circumferential extent about axis 66 and at the same time extends axially of axis 66. As viewed in FIG. 3, each ramp 76 extends axially rearward of axis 66 in the clockwise direction. At the counterclockwise end of each ramp 76 as viewed in FIG. 3, there exists a corresponding notch 78 that provides radial and circumferential clearance for a purpose to be hereinafter explained in greater detail.

Figure 5:
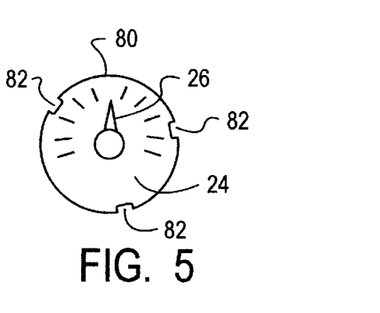
FIG. 5 is a front plan view of a gauge assembly on the same scale as FIGS. 3 and 4.
Figure 6:
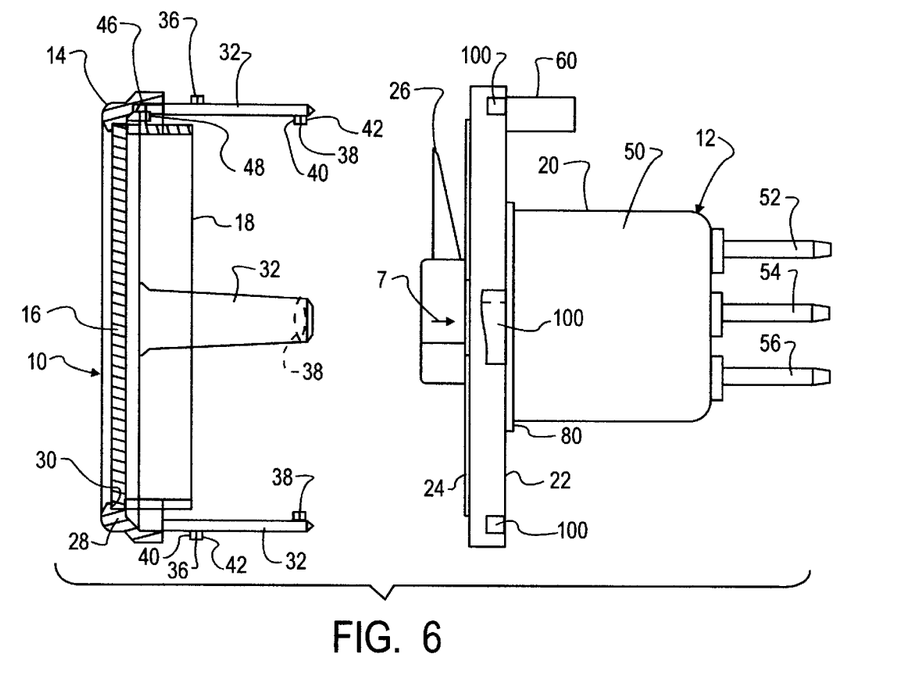
FIG. 6 is a view similar to FIG. 1, but showing the second preferred embodiment of the present invention.

In each gauge assembly 12, dial plate 22 and dial graphic 24 extend radially outwardly of housing 50 and comprise in their common radially outer margin 80 a series of three notches 82 (see FIG. 5) that are arranged circumferentially in the same non-symmetrical manner as fingers 32 are. Housing 72 comprises means for circumferentially orienting gauge housing 50 to a particular circumferential orientation. Such means may take the form of terminals of a printed wiring board 83 with which terminals 52, 54, 56 mate when the gauge assembly is fully installed in the instrument panel and/or keying means on the axial wall of housing 72 that circumferentially key gauge housing 50 therein. Housing 50 is therefore circumferentially located relative to aperture 64 to in turn circumferentially locate notches 78 relative to notches 82. Specifically, notches 82 are circumferentially disposed immediately counterclockwise of their respective ramps 76 as viewed in FIG. 3. The circumferential extent of each notch 78 is greater in the counterclockwise sense as viewed in FIG. 3 than is the circumferential extent of each notch 82. The extent by which it is greater is represented by the reference numeral 84 in FIG. 3. Thus in each region represented by the numeral 84, the radial outer margin 80 of each gauge is present, for a purpose to be hereinafter more fully described.

The features that are relevant to the invention having therefore been described, it is appropriate to consider their interrelationship. Specifically, reference is made to FIG. 2 which shows assemblies 10 and 12 assembled to instrument panel 62. In the complete assembly, projections 36 are exerting a force on rear face 70 at three locations around marginal edge portion 75 that is forcing the rear edge of ring 28 against front face 68. At the same time, projections 38 are exerting a force at three locations on margin 80 of gauge assembly 12 that is forcing dial plate 22 and dial graphic 24 against the rear edge of retaining ring 18. In this condition, assembly 10 is securely mounting assembly 12 on instrument panel 62 such that pointer 26 and dial graphic 24 can be viewed through glass 16 by an observer at the front of the instrument panel. In this condition, projections 36 are engaging ramps 76, and projections 38 are engaging the rear of radially outer margin 80. This condition corresponds to fingers 32 being circumferentially disposed in the regions designated by the numeral 86 in FIG. 3, and represents a first circumferential position of assembly 10 relative to aperture 64.

If assembly 10 is turned from the aforementioned condition counterclockwise as viewed in FIG. 3 to a circumferential position wherein each finger 32 is immediately adjacent the beginning of each ramp 76, but not as far counterclockwise as the regions indicated by the reference 84, projections 36 are clear of both ramps 76 and the edge of aperture 64, and projections 38 are clear of radially outer margin 80 and the gauge assembly 12. This represents a second circumferential position of assembly 10 relative to instrument panel 62 and gauge assembly 12.

If assembly 10 is turned further counterclockwise as viewed in FIG. 3 to a circumferential position wherein each finger 32 occupies a corresponding region 84, then projections 36 remain clear of ramps 76 and marginal edge portion 75 while projections 38 cease to circumferentially register with notches 82 and instead are disposed once again behind margin 80 of gauge assembly 12. This represents a third circumferential position of assembly 10 relative to the instrument panel and gauge assembly 12.

In the first circumferential position of assembly 10 mentioned above, assembly 10 is securely mounting gauge assembly 12 and itself on the instrument panel via the corresponding aperture 64. When in the second circumferential position described above, assembly 10 can be removed from the instrument panel by moving assembly 10 axially away from the instrument panel. Because projections 38 are at that time clear of gauge assembly 12, gauge assembly 12 remains behind in the instrument panel. When in the third circumferential position mentioned above, assembly 10 can be removed from the instrument panel by moving assembly 10 axially away from the instrument panel, but because projections 38 are now once again disposed behind margin 80, assembly 10 will also extract gauge assembly 12 from the instrument panel. Because gauge assembly 12 is a plug-in type gauge, the terminals 52, 54, 56 automatically separate from their mating terminals in wiring board 83 in the process.

It can therefore be appreciated that the invention provides both the possibility of removing only bezel/glass/retaining ring assembly 10 by itself from instrument panel 62 and the possibility of removing gauge assembly 12 along with assembly 10. Each possibility has its own advantages. For example, when it is desired merely to clean the inside of glass 16, the former possibility is useful; when gauge assembly 12 is to be serviced, the latter is useful. In both cases, disassembly can be expediently performed without separate tools. The servicing person manually grasps the outer perimeter of ring 28 with the tips of his thumb and fingers and turns assembly 10. Where gauge assembly 12 is of the plug-in type, the terminals automatically separate from wiring board 83 at disassembly so that there is no need for disconnecting wiring from the gauge.

Installation is accomplished in the opposite fashion from removal. If only bezel/glass/retaining ring assembly 10 is out of instrument panel 62, it is installed by registering fingers 32 with regions 90 that are circumferentially intermediate regions 84 and 86, as shown in FIG. 3, and then axially advancing assembly 10 toward the instrument panel so that fingers 32 pass through aperture 64 and so that the rear edge of ring 28, which radially overlaps marginal edge portion 75, is brought into contact with front face 68. Then assembly 10 is manually turned clockwise as viewed in the direction of FIG. 3 so that fingers 32 move into regions 86. As assembly 10 is being turned, faces 40 of projections 36 and of projections 38 act on the rear faces of ramps 76 and margin 80 respectively. The actions are those of camming and cammed means, causing respective retention forces to be developed: the first for forcing ring 28 to bear on front face 68; and the second for forcing the outer margin of the front face of dial plate 22 to bear against a portion of assembly 10 that radially overlaps aperture 64, specifically to bear directly against the rear edge of retaining ring 18. As assembly 10 is being tightened in this manner on the instrument panel, the rear edge of ring 28 is being forced directly against front face 68 to create between them an effective seal against intrusion of both dirt and light, the two parts being non-transparent. While these cam actions develop effective retention forces, the use of textured surfaces, such as for front face 68, provides surface friction effects for augmenting the tightness of the mounting. This can be helpful in minimizing the risk of the mounting becoming loose in an environment where normal usage encounters vibrations that may tend to encourage loosening.

If both bezel/glass/retaining ring assembly 10 and gauge assembly 12 are out of instrument panel 62, the latter assembly is installed first by inserting it through aperture 64 to connect its terminals with their mating ones on wiring board 83. Assembly 10 is then installed by the procedure just described. In the completed installation, pointer 26 and dial graphic 24 are disposed just behind window 16 where they can be readily seen by an observer.

From consideration of the first embodiment, the reader can perceive that when assembly 10 has been turned to the third circumferential position in order to extract gauge assembly 12, its projections 38 have little axial clearance to margin 80. Hence, bezel 14 can at most be moved axially away from cover plate 74 only a relatively small distance before the friction force between terminals 52, 54, and 56 and the terminals with which they mate on wiring board 83 is encountered. If this force is significant, and if the radially outer surface of bezel ring 14 is relatively short in the axial direction and/or it is smooth, then the person's finger's may slip off, making it difficult to extract the gauge, and possibly encouraging the person to use a prying tool between the rear edge of the bezel ring and cover plate 74. The second and currently preferred embodiment of the invention that will now be described addresses this situation, and it is effective in maximizing the likelihood that the gauge extraction will proceed entirely by hand with out the use of a prying tool.

DESCRIPTION OF THE PREFERRED EMBODIMENT

FIGS. 6–11 relate to the second embodiment, and its parts that have counterparts in the first embodiment will be identified by like reference numerals. Certain similarities between the two embodiments can be readily seen from comparison of their respective Figs., and in the interest of brevity, many of the parts shown in FIGS. 6–11 will not be described in detail since they are like their counterparts in the first embodiment. Essentially, it will be how the two embodiments differ that will be described.

Speaking generally, the second embodiment is a two-position turn lock bezel that, when turned to a first circumferential position, locks itself and the gauge on the instrument panel housing, and when turned to a second circumferential position, can be pulled axially away from the face of the instrument panel and extract the gauge in the process. Thus, this particular second embodiment lacks a circumferential position that would allow its bezel/glass/ retaining ring assembly 10 to be removed by itself without also extracting the gauge assembly 12 in the process.

Figure 8:
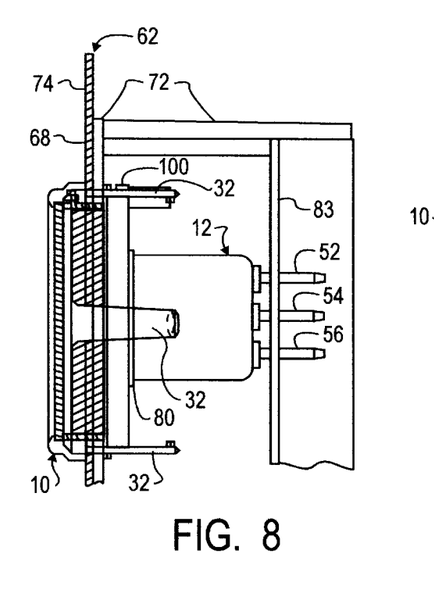
FIG. 8 is a view similar to FIG. 2 for the second embodiment showing the two assemblies assembled on an instrument panel.

Bezel/glass/retaining ring assembly 10 of the second embodiment is exactly like that of the first embodiment except that its fingers 32 are significantly longer than those of the first embodiment, increasing the spacing distance between projections 36 and projections 38 such that while projections 36 remain in the same locations on their respective fingers, projections 38 are spaced much further away from projections 36. The installed position shown in FIG. 8 shows assembly 10 in the first circumferential position and reveals that projections 36 are exerting a force on rear face 70 to force the rear edge of ring 28 against cover plate 74 and front face 68, thereby locking assembly 10 on the instrument panel. Fingers 32 are in the regions 84 of the mounting aperture 64 at this time. Because of the increased length of fingers 32 and of the spacing distance of projections 38 from projections 36, projections 38 are spaced some distance from margin 80 of the gauge assembly so that, unlike the first embodiment, they are exerting no force urging the gauge assembly toward assembly 10.

Figure 9:
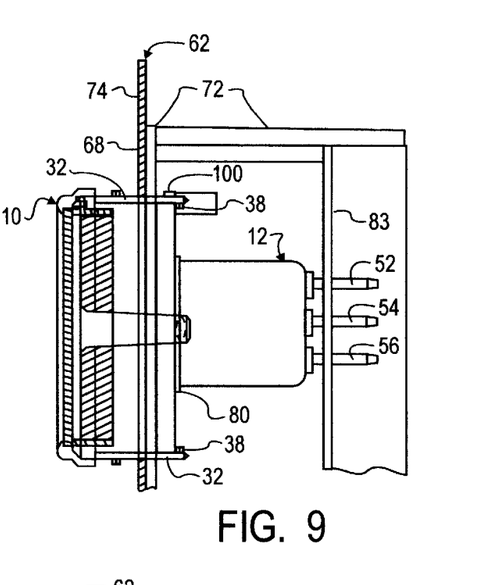
FIG. 9 is a view of the second embodiment, in the same direction as the view of FIG. 8, showing an intermediate stage in the gauge extraction process.
Figure 10:
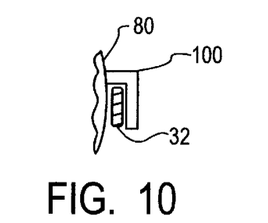
FIG. 10 is a fragmentary cross-sectional view in the direction of arrows 10—10 in FIG. 9.
Figure 11:
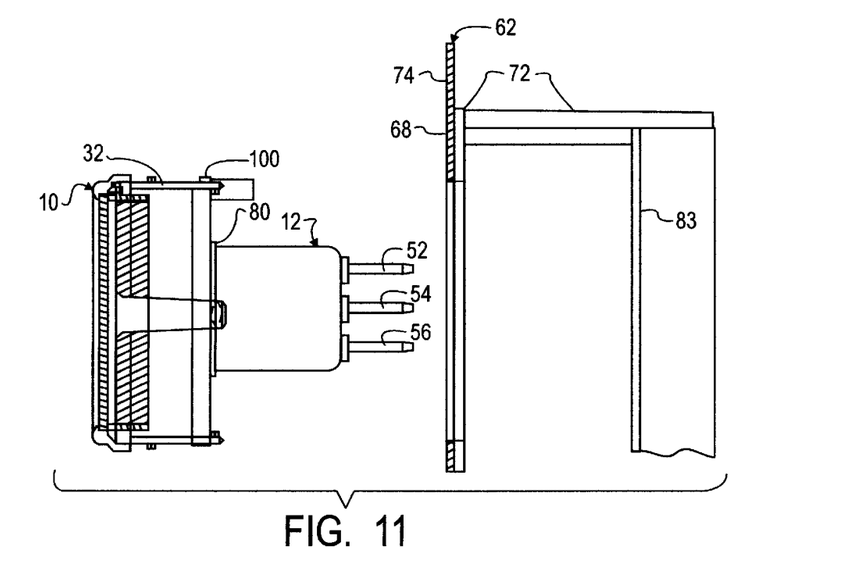
FIG. 11 is a view of the second embodiment, in the same direction as the views of FIGS. 8 and 9, showing a further stage in the gauge extraction process.

If bezel ring 28 is now grasped and turned to another circumferential position, it can be used to extract gauge assembly 12. This other position may correspond to the fingers being in the region 84 of the mounting aperture 64 so that projections 36 have come off ramps 76 and are clear of the marginal edge portion 75 of the aperture. Assembly 10 can now be freely pulled away from the instrument panel, but unlike the first embodiment, projections 38 must travel axially a certain distance before they will engage margin 80 and begin to extract the gauge assembly. The axial lost motion that projections 38 must take up before they contact margin 80 allows the rear edge of bezel ring 28 to be spaced a certain distance from the instrument panel face at the time that projections 38 contact margin 80 as shown by FIG. 9. This distance, which may be one-half inch or so, allows the person to re-grip the ring so that his or her finger tips can get behind this rear edge of the bezel ring and thereby obtain a much better grasp for pulling the gauge out of its mounting if significant resistance is encountered due to the frictional forces between the mated electrical terminals. FIG. 11 shows gauge assembly 12 to have been fully extracted by assembly 10.

Figure 7:
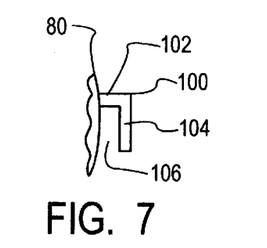
FIG. 7 is a fragmentary view in the direction of arrow 7 in FIG. 6.

When in the installed position, gauge assembly 12 itself cannot turn. Bezel/glass/retaining ring assembly 10 of course can. In order to define the circumferential position of assembly 10 relative to gauge assembly 12 that will allow gauge extraction, margin 80 is provided with a number of hooks 100 corresponding to the number of fingers 32. These hooks are also referred to as bezel finger retaining hooks since they are also used when assembly 10 is used to install or re-install gauge assembly 12. Hooks 100 are arranged circumferentially on margin 80 in the same relative locations as are fingers 32 on assembly 10. The shape of a hook is shown in FIG. 7 where it can be seen to comprise a radially outwardly extending portion 102 and a circumferentially extending portion 104 at the radially outer end of portion 102 thus defining a throat 106 that is open in one circumferential direction toward a respective finger 32. As assembly 10 is being turned from the first position to bring it to the position where the fingers can extracting the gauge assembly, a portion of each respective finger 32 that lies between its projections 36, 38 will come to enter throat 106 of the respective hook 100, and to abut portion 102 thereof. Such abutment (FIG. 10) defines the limit of turning, and hence defines the circumferential position of assembly 10 that will enable it to extract gauge assembly 12. It can be appreciated of course that hooks 100 are properly circumferentially related to regions 84 of the mounting aperture 64.

Installation of gauge assembly 12 is accomplished by first properly orienting it relative to assembly 10 while both are outside the instrument panel, and then properly orienting assembly 10 to the instrument panel. Before installation, the two assemblies are assembled together in the manner of FIG. 11 while outside the instrument panel. Fingers 32 are disposed in throats 106 of hooks 100 as in FIG. 10 to provide proper circumferential orientation of the two assemblies 10 and 12. Proper circumferential orientation of assembly 10 to the instrument panel may be provided by aligning respective indicia on each such as a legend "TOP" inscribed on the rear of the bezel with the top of the gauge dial graphics. The combined assemblies 10, 12 are then inserted into the housing with the gauge terminals 52, 54, 56 being thereby guided into mating engagement with the respective terminals on circuit board 83. Once full insertion has been completed, bezel 14 is turned to the first position locking it to the instrument panel face by means of projections 36, as described earlier. As the bezel is being turned, fingers 32 exit throats 106 of hooks 100. Although the projections 38 of this second embodiment do not serve to lock the gauge assembly 12 as they did in the first embodiment, the overall construction provides a satisfactory mounting with the gauge movement and light pipe assembly being very effectively trapped between the housing and the bezel.

Principles of the invention are applicable to embodiments other than the ones that has been specifically illustrated. For example, a gauge assembly using projections 38 in the manner of the first embodiment may be retained by forcing it against rear face 70 while the mating bezel/glass/retaining ring assembly is retained by forcing a portion of it that radially overlaps the mounting aperture against a portion of the gauge assembly that is radially within aperture 64, and in such an embodiment, a portion of the bezel/glass/retaining ring assembly that radially overlaps the marginal edge portion of the mounting aperture may still have a sealing contact with the front face of the instrument panel and cover the edge of the aperture. While the invention is especially useful with plug-in type gauges, the invention can be used with non-plug-in types. Embodiments other than the ones specifically disclosed herein will perhaps suggest themselves to those skilled in the art.

What is claimed is:

1. In combination:
   A) an instrument panel having an aperture that extends axially in said instrument panel and that is bounded by a marginal edge portion of said instrument panel that is disposed peripherally about said aperture;
   B) an instrument gauge that comprises:
      1) electrical input terminal means for receiving an electrical input signal that represents the value of an input to said gauge; and
      2) a front display at which said gauge presents the value of such an electrical input signal;
   C) electrical supply terminal means for separable mating with said input terminal means of said gauge for supplying such an electrical input signal to said input terminal means;
   D) means defining an installed position for said gauge relative to said instrument panel wherein said gauge is disposed in registration with said aperture for removal from the installed position by being extracted via said aperture, and wherein said electrical supply terminal means are separably mated with said input terminal means; and
   E) bezel means comprising:
      1) a front bezel portion that is disposed axially forward of and overlaps both said aperture and said marginal edge portion of said instrument panel and that allows said front display to be viewed by an observer with said gauge being in the installed position; and
      2) gauge extraction means that extends axially rearward from said front bezel portion through said aperture and, upon said bezel means being bodily displaced axially forward, engages the installed gauge to cause said gauge to be bodily displaced axially forward, and thereby extracted from the installed position.

2. The combination set forth in claim 1 in which said electrical supply terminal means is mounted on an electrical wiring board that is spaced axially rearward of said aperture and said electrical supply terminal means and said electrical input terminal means are constructed and arranged such that upon said gauge being bodily displaced axially forward by said bezel means, said electrical input terminal means separates from mating with said electrical supply terminal means.

3. The combination set forth in claim 2 wherein an axial lost motion connection is provided between said gauge extraction means and the installed gauge for preventing said gauge extraction means from beginning to bodily displace said gauge axially forward until after said bezel means has been bodily displaced axially forward away from said instrument panel a distance that creates an axial clearance between said front bezel portion and said instrument panel to provide finger tip clearance enabling portions of a person's finger tips to intrude into said axial clearance.

4. The combination set forth in claim 1 in which said gauge comprises a peripheral marginal portion, and upon said bezel means being bodily displaced axially forward, said gauge extraction means engages said marginal portion of said gauge to cause said gauge to be bodily displaced axially forward, and thereby extracted from the installed position.

5. The combination set forth in claim 4 in which said peripheral marginal portion is disposed peripherally about a housing that contains a gauge movement that is operated by such an electrical input signal.

6. The combination set forth in claim 1 in which said instrument panel has a front face, a rear face, said aperture extends axially in said instrument panel between said front face and said rear face, and said bezel means comprises retention means applying a retention force that forces a portion of said front bezel portion that radially overlaps said marginal edge portion of said instrument panel against said front face of said instrument panel.

7. The combination set forth in claim 6 in which said gauge extraction means comprises finger means extending axially rearward from said front bezel portion through said aperture, first projection means that projects radially outwardly from said finger means to form said retention means, and second projection means that projects radially inwardly from said finger means for engaging said gauge to extract said gauge from the installed position.

8. The combination set forth in claim 7 in which said aperture has an imaginary axis about which said bezel means is circumferentially positionable to plural positions, said retention force is applied via said first projection means when said bezel means is in a first of said plural positions, said marginal edge portion of said instrument panel comprises clearance means with which said first projection means registers when said bezel means is in a second of said positions for allowing said first projection means to pass through said clearance means upon said bezel means being bodily displaced axially forward to extract said gauge, and when said bezel means is in the second of said positions, said second projection means is disposed to engage said gauge and extract said gauge from the installed position upon said bezel means being bodily displaced axially forward.

9. The combination set forth in claim 8 in which said second projection means is disposed on said finger means such that when said bezel means is in said second of said positions, said second projection means does not begin to engage said gauge until after said bezel means has been bodily moved axially away from said instrument panel a distance that creates an axial clearance between said front bezel portion and said front face of said instrument panel to provide finger tip clearance enabling portions of a person's finger tips to intrude into said axial clearance.

10. The combination set forth in claim 9 in which said axial clearance is on the order of one-half inch.

11. The combination set forth in claim 8 in which said gauge comprises means disposed in the path of travel of said finger means as said bezel means is being positioned from said first of said positions to said second of said positions to be abutted by said finger means and stop said bezel means when said bezel means arrives at said second of said positions.

12. The combination set forth in claim 11 in which said means disposed in the path of travel of said finger means as said bezel means is being positioned from said first of said positions to said second of said positions to be abutted by said finger means and stop said bezel means when said bezel means arrives at said second of said positions comprises hook means having a radially outwardly extending portion and a circumferentially extending portion at a radially outer end of said radially outwardly extending portion that cooperatively form throat means that is open circumferentially toward said finger means as said finger means approaches said hook means during positioning of said bezel means toward said second of said positions.

13. The combination set forth in claim 1 in which said front bezel portion comprises a full ring.

14. The combination set forth in claim 13 in which said ring is circular in shape.

15. In combination:
  A) an instrument panel comprising an aperture;
  B) an instrument gauge having a front display at which said gauge presents the value of an input to said gauge; and
  C) bezel means for mounting said gauge on said instrument panel such that said front display is presented via said aperture for viewing by an observer, said bezel means comprising a front bezel portion in front of said aperture;
  D) said instrument panel, said instrument gauge, and said bezel means comprising:
    1) means for circumferentially positioning said bezel means to two particular circumferential positions relative to both said aperture and gauge about a coaxis of said aperture, said gauge, and said bezel means;
    2) means forcefully retaining said bezel means in assembled relationship with said instrument panel when said bezel means is at a first of said two particular circumferential positions; and
    3) means allowing said bezel means to be disassembled from said instrument panel by moving said bezel means bodily axially away from said aperture and in the process said bezel means extracting said gauge from said instrument panel axially through said aperture when said bezel means is in a second of said two particular circumferential positions, including an axial lost motion connection between said bezel means and said gauge for preventing said bezel means from beginning to bodily extract said gauge until after said bezel means has been bodily moved axially away from said instrument panel a distance that creates an axial clearance between said front bezel portion and said instrument panel to provide finger tip clearance enabling portions of a person's finger tips to intrude into said axial clearance.

16. In combination:
  A) an instrument panel having a front face, a rear face, and an aperture that extends axially in said instrument panel between said front face and said rear face and that is bounded by a marginal edge portion of said instrument panel that is disposed radially of a central axis of said aperture;
  B) an instrument gauge having a front display at which said gauge presents the value of an input to said gauge; and
  C) bezel means for mounting said gauge on said instrument panel such that said front display is presented via said aperture for viewing by an observer comprising:
    1) a front bezel portion that is disposed over said front face of said instrument panel and that radially overlaps both said aperture and said marginal edge portion of said instrument panel;
    2) finger means extending rearwardly from said front bezel portion through said aperture;
    3) first retention means on said finger means for coaction with said rear face of said instrument panel to create a first retention force that forces a portion of said front bezel portion that radially overlaps said marginal edge portion of said instrument panel against said front face of said instrument panel; and
    4) second retention means on said finger means for coaction with said gauge to create a second retention force that forces said gauge against a portion of said front bezel portion that radially overlaps said aperture.

17. The combination set forth in claim 16 in which said first retention means comprises first projection means that projects radially outwardly from said finger means and said second retention means comprises second projection means that projects radially inwardly from said finger means.

18. The combination set forth in claim 17 including first camming and cammed means between said first projection means and said rear face of said instrument panel and second camming and cammed means between said second projection means and said gauge, said first and second camming and cammed means functioning to develop said first and second retention forces in response to turning of said front bezel portion relative to said aperture about an axis of said front bezel portion that is coaxial with said central axis of said aperture.

19. The combination set forth in claim 18 in which said first camming and cammed means comprises ramp means on said instrument panel which extends both circumferentially and axially of said central axis of said aperture and with which said first projection means reacts to develop said first retention force in response to turning of said front bezel portion relative to said aperture.

20. The combination set forth in claim 19 in which said aperture comprises clearance means at a beginning of said ramp means for allowing said first projection means to clear said ramp means and said marginal edge portion of said instrument panel when said front bezel portion is turned to one particular circumferential position to circumferentially register said first projection means with said clearance means whereby in that one particular circumferential position said bezel means can be removed from said aperture by bodily moving said front bezel portion axially away from said aperture.

21. The combination set forth in claim 20 including means to circumferentially constrain said gauge on said instrument panel to a given circumferential position relative to said aperture, in which said second camming and cammed means comprises a marginal edge portion of said gauge with which said second projection means reacts to develop said second retention force, and in which said second projection means is disposed in radially overlapping relationship with said marginal edge portion of said gauge both when causing said second retention force to be exerted on said gauge and also when said front bezel portion is turned to said one particular circumferential position whereby when said front bezel portion is in said one particular circumferential position and said bezel means is being removed from said aperture, said bezel means is also removing said gauge from said instrument panel via said aperture.

22. The combination set forth in claim 21 in which said marginal edge portion of said gauge comprises further clearance means at a beginning of said marginal edge portion of said gauge for allowing said second projection means to clear said marginal edge portion of said gauge when said front bezel portion is turned to another particular circumferential position at which said first projection means remains registered with said first mentioned clearance means whereby with said front bezel portion at that another particular circumferential position, said bezel means will not extract said gauge from said instrument panel via said aperture when said bezel means is being removed from said aperture.

23. The combination set forth in claim 16 in which said front bezel portion comprises a transparent window in covering relation to said aperture, a bezel ring in which said window is seated, and a retaining ring that holds said window seated in said bezel ring, and in which said second retention means causes said second retention force to force said gauge against said retaining ring.

24. The combination set forth in claim 23 in which said front display of said gauge is disposed within said retaining ring just rearward of said window, and in which said retaining ring is disposed within said aperture.

25. The combination set forth in claim 16 in which said second retention means is disposed on said finger means axially rearward of said first retention means.

26. The combination set forth in claim 16 in which said first and second retention means comprise respective axially facing curved surfaces that face in the same direction as does said front display.

27. The combination set forth in claim 16 in which said front bezel portion comprises a bezel ring that is forced by said first retention force to bear directly against said instrument panel front face.

28. The combination set forth in claim 16 in which said first camming and cammed means are operative between said first retention means and said rear face of said instrument panel to develop said first retention force in response to turning of said front bezel portion relative to said aperture about an axis of said front bezel portion that is coaxial with said central axis of said aperture, and in which second camming and cammed means are operative between said second retention means and said gauge to develop said second retention force in response to such turning of said front bezel portion.

29. The combination set forth in claim 28 in which said first camming and cammed means comprises for a first cammed means thereof an axially facing curved surface of said first retention means that faces in the same direction as does said front display and for a first camming means thereof an axially rearward facing ramp surface in said rear face of said instrument panel, and in which said second camming and cammed means comprises for a second camming means thereof an axially facing curved surface of said second retention means that faces in the same direction as does said front display and for a second cammed means thereof a rear face of a marginal edge portion of said gauge.

30. In combination:
A) an instrument panel comprising an aperture;
B) an instrument gauge having a front display at which said gauge presents the value of an input to said gauge; and
C) bezel means for mounting said gauge on said instrument panel such that said front display is presented via said aperture for viewing by an observer;
D) said instrument panel, said instrument gauge, and said bezel means comprising:
1) means for circumferentially positioning said bezel means to three particular circumferential positions relative to both said aperture and gauge about a coaxis of said aperture, said gauge, and said bezel means;
2) means forcefully retaining said bezel means and said gauge in assembled relationship with said instrument panel when said bezel means is at a first of said circumferential positions;
3) means allowing said bezel means to be disassembled from said instrument panel and gauge while said gauge remains mounted on said panel by moving said bezel means axially away from said aperture when said bezel means is at a second of said circumferential positions; and
4) means allowing said bezel means to be disassembled from said instrument panel by moving said bezel means axially away from said panel and in the process said bezel means extracting said gauge from said instrument panel axially through said aperture when said bezel means is at a third of said circumferential positions.

31. The combination set forth in claim 30 in which said three circumferential positions are disposed such that said second of said circumferential positions is circumferentially between said first and third of said circumferential positions, and is no more than an acute angle from each of said first and third of said circumferential positions.

\* \* \* \* \*